2 Sheets—Sheet 1.

C. W. LEVALLEY.
HARVESTER.

No. 183,577. Patented Oct. 24, 1876.

Witnesses:
Alex Mahon
John G. Center

Inventor:
C. W. Levalley.
by A. M. Smith
Attorney

2 Sheets—Sheet 2.

C. W. LEVALLEY.
HARVESTER.

No. 183,577. Patented Oct. 24, 1876.

Witnesses:
Alex Mahow
John G. Center

Inventor:
C. W. Levalley
by A. M. Smith
Attorney

UNITED STATES PATENT OFFICE.

CHRISTOPHER W. LEVALLEY, OF ST. PAUL, MINNESOTA.

IMPROVEMENT IN HARVESTERS.

Specification forming part of Letters Patent No. 183,577, dated October 24, 1876; application filed May 18, 1875.

*To all whom it may concern:*

Be it known that I, CHRISTOPHER W. LEVALLEY, of St. Paul, county of Ramsey, and State of Minnesota, have invented certain new and useful Improvements in Grain-Harvesters, of which the following is a full, clear, and exact description, reference being had to the accompanying drawings, making part of this specification, in which—

Figure 1:
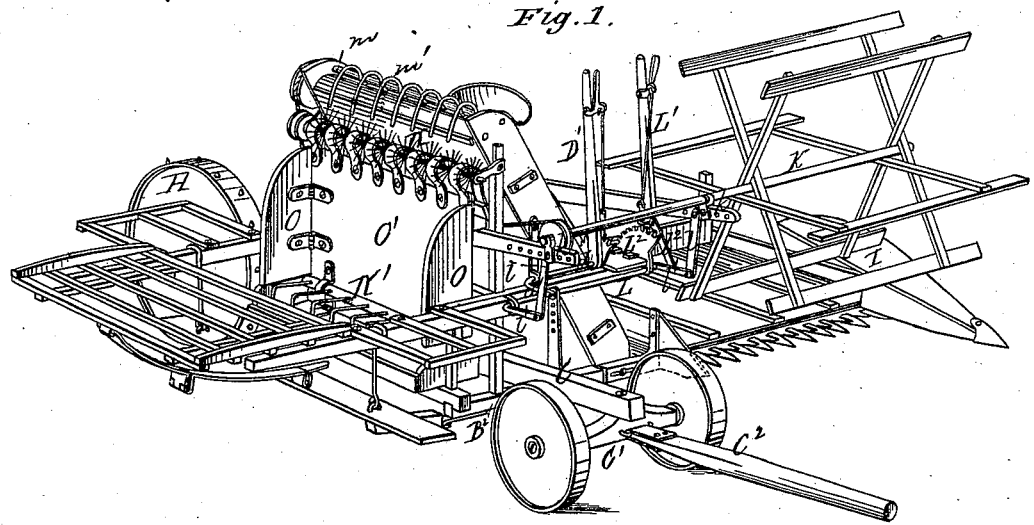
Figure 2:
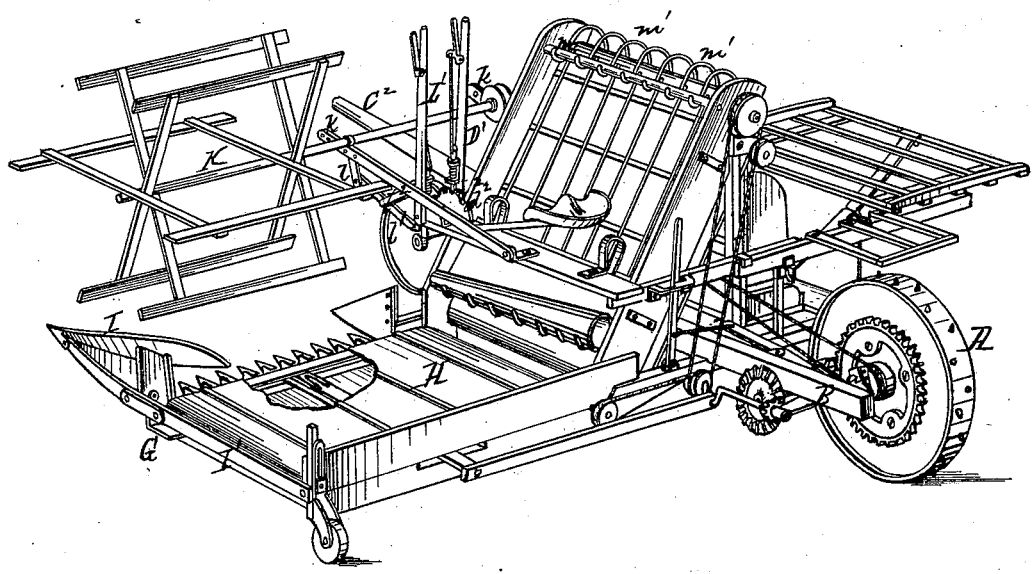
Figure 3:
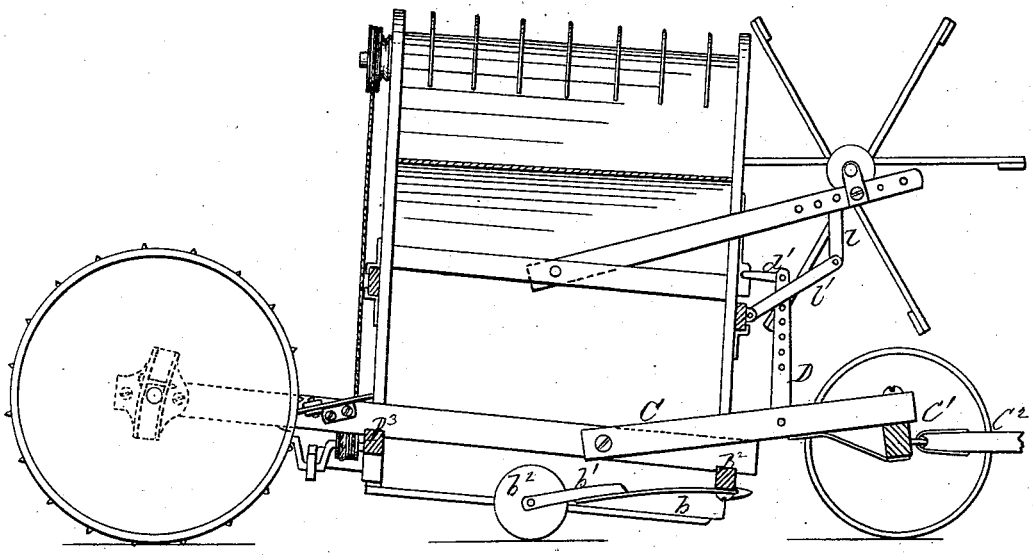
Figure 4:
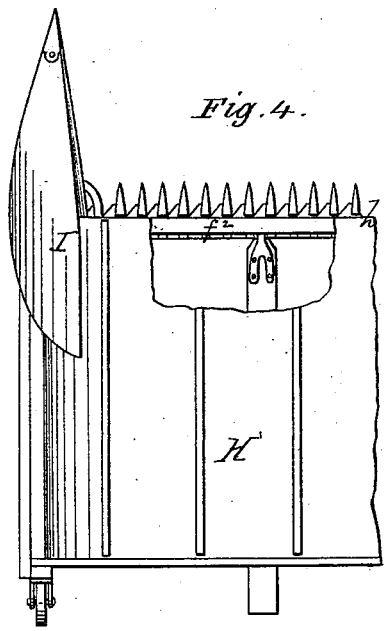
Figure 5:
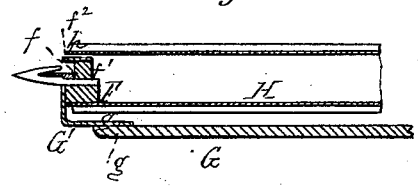

Figure 1 is a perspective view of my improved machine, taken from the front stubble-side corner. Fig. 2 is a similar view taken from the rear grain-side corner. Fig. 3 is a vertical longitudinal section through the same, looking toward the grain side, and showing the arrangement of the jointed truck-bar and drive-wheel. Fig. 4 is a plan view of the divider end of the platform-apron with the divider applied, and Fig. 5 is a vertical section through the finger and sickle bars and front of the platform-apron.

Similar letters of reference denote corresponding parts of the machine wherever used.

My invention relates, first, to a novel arrangement of the bar to which the guards or fingers are attached, and of the cap-plate connected therewith and overhanging the sickle-bar, whereby the platform-apron is adapted to overhang and pass around said finger and sickle bars, as hereinafter explained; second, to the manner of hinging the wind guards or boards to the delivery-board, over which the grain descends from the elevator to the binders' table, whereby they are adapted, when not in use, to be folded in between said delivery-board and the folding binders' table; and, third, to a novel arrangement of the supports and adjusting devices of the overhung reel, for facilitating the adjustment of said reel while the machine is in operation.

The main frame and the platform and elevator frame, except in particulars hereinafter particularly pointed out, are of the usual construction and arrangement. The drive-wheel A, instead of being mounted in the open space underneath the elevator-frame, is placed in rear of said frame, and has its axle secured in grooved or flanged segments $a$, which permit its adjustment, said segments being secured to the adjacent faces of the rear ends of the longitudinal frame-bars B B$^1$. To the bar B, at or near midway between the transverse frame-bars B$^2$ B$^3$, the rear end of a truck bar or frame, C, is pivoted, said bar or frame at its forward end being rigidly connected with the axle of a truck, C$^1$, to which the pole or tongue C$^2$ of the machine is attached. To the truck-bar C, at or near midway of its length, is pivoted the lower end of a link-standard, D, the upper end of which is connected with a crank-arm, $d^1$, on a rock-shaft, $d$, mounted in suitable bearings on the elevator-frame, and provided at one end with a lever, D$'$, by means of which the driver can rock the shaft $d$, and raise or lower the front of the main frame relatively to the truck-bar C, as desired. A retaining-rack, $d^2$, in connection with a spring latch or pawl applied to the lever D$'$, serves to hold the lever D$'$ at any desired adjustment, and practically to make the joint between the bars B and C rigid under any adjustment at which the lever D$'$ may be set. To the forward transverse frame-bar B$^2$ in rear of the truck C$^2$ is pivoted the forward end of a stiff plate or strap spring, $b$, to the rear end of which is attached the shank $b^1$ of a caster-wheel, $b^2$, the arrangement being such that said wheel, through its spring attachment, serves to take the weight of the front of the main frame, and thereby to facilitate its adjustment, as well as to add to its freedom or ease in turning corners. F, Fig. 5, represents the bar to which the fingers are attached. This bar is supported above the platform-flooring G by an angle iron or bar, G$'$, which covers the forward face of the bar F, and, extending below the same, has the platform attached to its horizontal portion $g$, leaving an open space under the bar F, for the lower returning portion of the platform-apron H to work in. Over the bar F, and in rear of the sickle-bar $f$, is a bar or ledge, $f^1$, covered by a strip or plate of metal, $f^2$, which overhangs the sickle-bar, and serves to protect the forward edge of the carrying portion $h$ of the platform-apron resting and moving on said plate $f^2$, and overhanging the sickle-bar, as shown in Fig. 5. The platform-apron passes around the ends of the sickle and finger bars sufficiently far removed therefrom to provide for the throw or reciprocation of the former, and the outer end is thus made to extend some distance past or outside of the inner line of the divider I. The divider I terminates at its inner side at the angle-iron G, being connected therewith by an angular bracket, which covers the forward end of the outer apron-roller and the projecting portion of the apron, and a strap or board, I', extends from at or near the point of the divider on the outside thereof along the outer end of the platform, forming the platform end-board for protecting the apron. The reel employed is of that class known as the "overhung reel," and its shaft K is supported in two bearers, $k$ $k$, at its inner end, said bearers being pivoted at their rear ends at any convenient point on the elevator-frame and seat-plank, as shown in Figs. 2 and 3, and at a suitable distance in front of their pivots these bearers $k$ have pendent links $l$ $l$ connected with them, the lower ends of said links being connected with crank-arms $l^1$ on a rock-shaft, L, and a lever, $L^1$, connected by a link, $l^2$, with one of the arms $l^1$, enables the attendant at will to rock the shaft L, and thus, through the connection described, to raise or lower the reel, as the condition of the crop may require. A holding-rack, $L^2$, in connection with a spring retaining-pawl applied to the lever $L^1$, holds said lever, and therewith the reel, at any required adjustment. The grain-elevator, with its spring retaining or compressing wires, are of the usual construction, except that said wires are made straight, and terminate at their upper ends at or near the upper end of the elevator, instead of curving over the same, as heretofore. For turning or deflecting the grain carried up by the elevator outward and downward, and causing it to be deposited in the grain-receiver, I use a deflector constructed as follows, viz: $m$ is a roller or shaft, pivoted in the upper end of the elevator-frame, and provided with a number of yielding or spring rods or fingers, $m'$, which extend up and over the upper end of the elevator, and thence curve downward, in such manner that the grain carried up by the elevator will strike against said curved fingers, and will be deflected outward and downward, following the movement of the upper end of the elevator-apron in passing over the upper roller, from which it will be removed by a stripping-brush, N, and deposited in the grain-receptacle at N'. This grain-receptacle may be of the usual construction, except that in front and rear it is provided with end-boards O, hinged on their inner edges to the delivery-board O', over which the grain descends to the receptacle. These end-boards protect the grain from the action of the wind, and prevent it from being scattered in descending to the receptacle, while at the same time, being hinged, they can be folded against the delivery-board O, and between said board and the folding binders' table when not in use.

Parts of the machine not hereinbefore particularly described may be constructed in any usual manner.

Having now described my invention, what I claim as new, and desire to secure by Letters Patent, is—

1. The finger-bar F, provided with the cap-plate $f^2$, overhanging the sickle-bar, in combination with the platform carrier-apron H, overhanging and passing around the finger and sickle bars, substantially as and for the purpose set forth.

2. The wind guards or boards O O, hinged to the delivery-board O' in such manner as to fold between said delivery-board and the folding binders' table, substantially as described.

3. The overhung reel, mounted upon reel-bearers pivoted at their rear ends, in combination with links $l$, crank-arms $l^1$, rock-shaft L, and adjusting-lever $L^1$, all arranged and operating as described.

CHRISTOPHER W. LEVALLEY.

Witnesses:
   JAS. R. WALSH,
   THEO. E. BLASE.